(No Model.)
W. J. RICKARD.
ELECTRICAL INDICATOR FOR VALVES.
No. 588,880.　　　　　　　　　Patented Aug. 24, 1897.
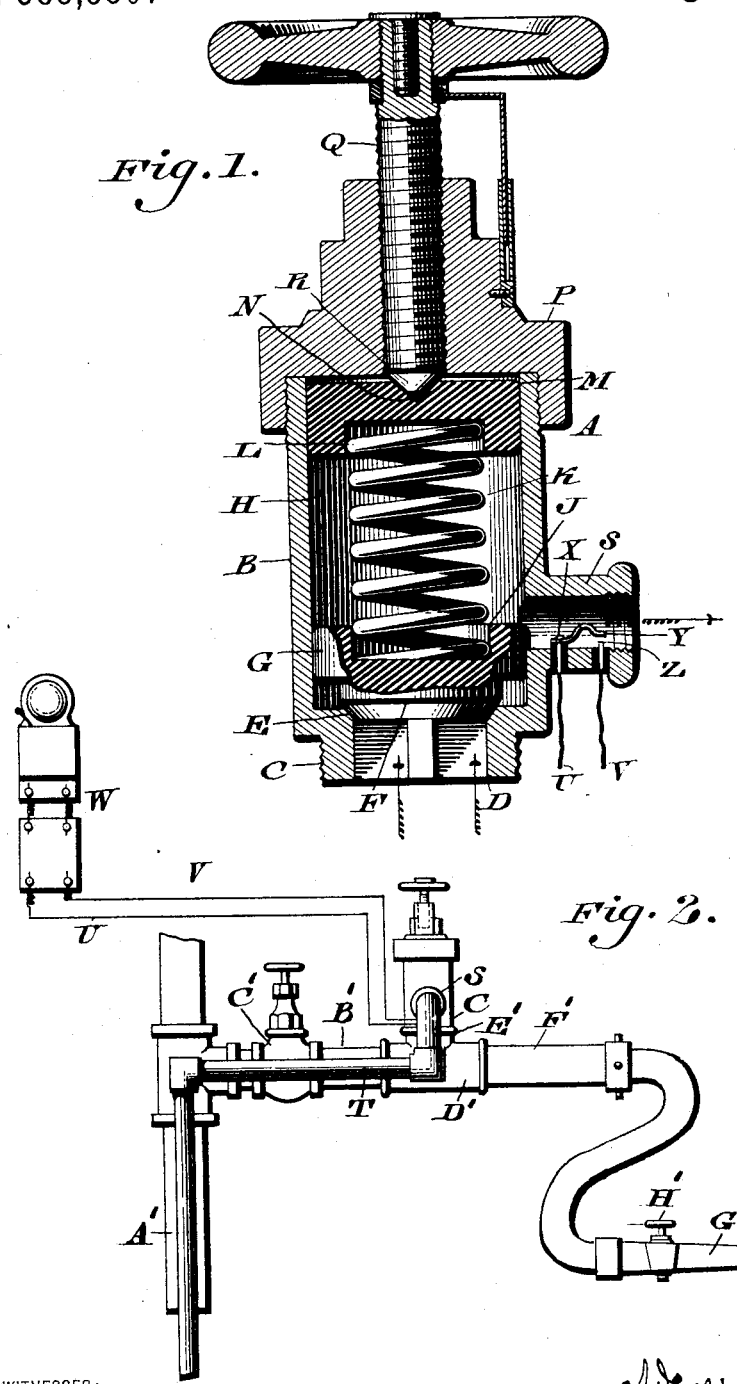
WITNESSES:
INVENTOR
William J. Rickard.
BY
ATTORNEY.

UNITED STATES PATENT OFFICE.

WILLIAM J. RICKARD, OF PHILADELPHIA, PENNSYLVANIA.

ELECTRICAL INDICATOR FOR VALVES.

SPECIFICATION forming part of Letters Patent No. 588,880, dated August 24, 1897.

Application filed October 31, 1896. Serial No. 610,742. (No model.)

*To all whom it may concern:*

Be it known that I, WILLIAM J. RICKARD, a citizen of the United States, residing in the city and county of Philadelphia, State of Pennsylvania, have invented a new and useful Improvement in Electrical Indicators for Valves, &c., which improvement is fully set forth in the following specification and accompanying drawings.

My invention consists of an improved construction of electrical indicators for valves, which are adapted to be attached to a suitable portion of a conduit and to have an overflow-pipe connected therewith, provision being made for announcing at any given point the fact that the flow of water through the conduit has been stopped and that it is desired to shut off the source of supply therefor.

It further consists of novel details of construction, all as will be hereinafter set forth, and specifically pointed out in the claims.

Figure 1 represents a sectional view of a valve having attached thereto a portion of an indicating device embodying my invention. Fig. 2 represents a side elevation of the indicating apparatus complete, showing the parts in connected or assembled position.

Similar letters of reference indicate corresponding parts in the two figures.

Referring to the drawings, A designates the preferred form of valve employed, the same consisting of the barrel-casing B, having its lower end screw-threaded, as at C, and provided with an inlet-opening D.

E designates a seat located adjacent the opening D, upon which the valve F is adapted to abut, said valve being attached to the head G, which is provided with a socket J, in which is seated the end of the spring K, the other end of the latter abutting in the socket L of the head M. N designates a seat or depression in the upper portion of said head M, in which the end R of the threaded stem Q is adapted to rest, said stem passing through and engaging a threaded opening in the cap C, which is attached to the shell or barrel B of the valve.

S designates a boss or discharge-outlet from the barrel B, to which the overflow-pipe T is attached.

U and V designate wires or other conductors which lead from a suitable indicating device, which may be a gong or electric bell W, which is located in an electric circuit, said wires having their ends attached, respectively, to the conductors X and Z, the same having their terminals located within the passage in the boss S and being suitably insulated.

Y designates a spring or circuit-breaker which is mounted on the terminal X and is adapted to contact with the terminal Z when force is applied thereto, such as may be caused by the flow of water to the overflow T, it being of course evident that any other suitable circuit-breaking device may be employed, A' designates a water-main which has a branch leading therefrom to the gate-valve C', the latter having the pipe or conduit B' attached thereto, which enters the T D', the latter having a threaded opening E' located therein, with which the threaded portion C of the valve A is adapted to engage, said valve being thus normally removed out of the direct flow of the water.

F' designates a pipe or conduit B', which connects with the T D', which terminates in a hose, which may be of any desired length, and has a discharge-nozzle G' attached thereto, the flow therethrough being controlled by a cock H'.

The operation is as follows: In case of fire or other emergency, when it is desirable for the water to be discharged through the nozzle G' the gate-valve C' and the cock H' are opened and a free and uninterrupted passage of water takes place through the pipes B' F' and the nozzle G', the valve F being seated, as indicated in Fig. 1. When it is desired to cut off the discharge of water and at the same time notify the attendant in charge of the pumping or forcing apparatus that the same should be stopped, it is only necessary for the cock H' to be closed, whereupon the water in the conduits B' F' will instantly back up through the opening D into the valve F and discharge the accumulated water through the outlet S into the overflow T. This discharge of water which forcibly takes place will cause a contact to be made between the spring-contact Y and the terminal Z, thereupon completing the circuit and sounding the alarm W, which latter, it will be understood, is to be located near the pumping mechanism, thereby notifying the attendant to at once stop the operation of the same since it is no longer needed.

It will of course be evident that the alarm or gong W can be located at such other points as may be desired—the engine-house, office, or at a residence, as may be deemed expedient.

The tension of the spring K and of the spring-contact Y can of course be changed, varied, or adjusted according to requirements, and the pressure of the valve F upon its seat can also be varied by manipulating the stem Q, and it will be evident that various changes may be made by those skilled in the art which will come within the scope of my invention, and I do not, therefore, desire to be restricted in every instance to the device herein shown and described.

It will be noticed that by the mechanism herein described an outlet is provided for the backed water in the pipes H' and B' and the T D, so that in case of any delay of the attendant at the pumping mechanism in stopping the operation of the same there will be no pressure upon said pipes.

Having thus described my invention, what I claim as new, and desire to secure by Letters Patent, is—

1. In an electrical indicating apparatus, a main conduit, a valve-chamber connected therewith outside of the direct line of flow of fluid in said conduit, a nozzle having a cock connected with the conduit, a normally open electric circuit provided with an alarm, and a circuit-closer therein in the outlet of said valve-chamber controlling said alarm.

2. In an indicating apparatus, a conduit, a valve communicating therewith, an overflow-pipe leading from said valve, a circuit-closer located in the discharge-outlet of said valve, an alarm device controlled by said circuit-closer, a discharge-nozzle in communication with said circuit, and a valve for opening and closing said nozzle.

3. In an indicating apparatus, a valve-casing having an opening in its lower portion, a valve-seat, a valve adapted to abut against the latter, a spring having one end abutting against said valve, a head located in the upper portion of said valve against which the other extremity of said spring contacts, a threaded stem in engagement with said last-mentioned head, a discharge-outlet for the valve, a terminal of an electric circuit located in said outlet, and having a contact device mounted thereon, the free end of said device being adapted to contact with an adjacent terminal of the electric circuit, and an alarm device.

4. An indicating device, a discharge-main, a gate-valve therein, a safety-valve located in said discharge-main, in advance of said gate-valve, a hose or nozzle located in advance of said safety-valve, an overflow for the latter, and an electrically-operated alarm device attached to said safety-valve, and adapted to be operated when the flow of water through said nozzle is cut off.

5. In an indicating apparatus of the character described, a main pipe A', a conduit B' attached thereto having a gate-valve C' therein, a T D' leading from said conduit B', and having a safety-valve communicating therewith, an overflow for said valve, a circuit-breaker in said overflow, connections from said circuit-breaker to an alarm, a discharge-nozzle, connections intermediate the latter and said T, and means for stopping the flow of water through said nozzle.

WILLIAM J. RICKARD.

Witnesses:
  GEORGE HARFORD,
  ELY K. RICKARD.